W. B. KRAFT.
MEANS FOR REPRESENTING MUSIC.
APPLICATION FILED MAR. 6, 1909.
1,009,671.   Patented Nov. 21, 1911.
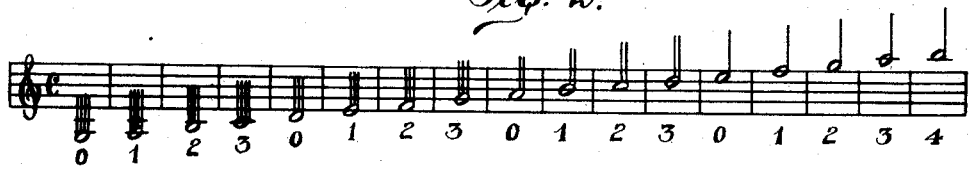
Witnesses
Ernest Crocker
Joseph J. O'Brien
Inventor
William B. Kraft
By David Postrichwel
Attorney
COLUMBIA PLANOGRAPH CO., WASHINGTON, D. C.

UNITED STATES PATENT OFFICE.

WILLIAM B. KRAFT, OF WASHINGTON, DISTRICT OF COLUMBIA.

MEANS FOR REPRESENTING MUSIC.

1,009,671. Specification of Letters Patent. Patented Nov. 21, 1911.

Application filed March 6, 1909. Serial No. 481,832.

*To all whom it may concern:*

Be it known that I, WILLIAM B. KRAFT, a citizen of the United States, residing at 802 K street northwest, in the city of Washington, District of Columbia, have invented certain new and useful Improvements in Means for Representing Music, of which the following is a specification.

This invention relates to improvements in means for representing music and the leading object of the invention is to provide an improved means for representing music by note symbols, whereby the musical education of beginners will be greatly facilitated and the self instruction or education of violin or other string music can be practically advanced.

It is well recognized that at the present time it is very difficult for ordinary students to acquire a rudimentary knowledge of violin playing, and for this reason many persons who are fond of violin and other like string music, and who desire to become proficient players, are discouraged by the initial difficulties and never realize their desires. Once a student has passed through the preliminary steps or stages of violin playing and has acquired a working knowledge of the elements of a violin, as well as a working knowledge of the particular significance of notes and of the methods of interpreting the notes and of articulating them, he or she is able to proceed with the finer branches of the art or technique and advance by continued practice in accordance with the degree of skill possessed.

The great problem of teaching students violin or like string instrument playing lies in the initial stages. If a student can be piloted through the initial stages progress is almost certain to follow in every case, depending of course on the earnestness and ability of the student. All efforts heretofore to provide a system of representing the notes in music designated for articulation by violin or other like instruments have failed. The problem is, necessarily, largely a problem of simplifying the elements of music and of playing so that a student can, with certain brief initial instructions, proceed by his or her own independent efforts, and of providing a simple system which will permit the student to take up the regular music without danger of confusion. To provide such a system of representing music I have invented a system of musical notation, wherein the notes are arranged in the usual musical order on the staff and indicating means are provided for directing the student to the proper frets on the instrument used and also for directing him to the proper strings on the instrument. The means used for indicating the frets consisting of properly placed numerals corresponding to the order of the frets, reading downwardly on the neck of the instrument, and the means used for indicating the strings of the instrument consisting of small lines arranged vertically over the heads of the note symbols and presenting to the student a visual appearance similar to that presented by the strings of the instrument. In this way, the student, after understanding the significance of the note symbols, will be able to instantly define the frets by the numbers, which are arranged beneath the note symbols, and will be able to instantly define the strings to be acted on for the articulation of the notes by the number of small vertical lines above the note symbols of the heads of the note symbols.

With the above object in view the invention consists in certain combinations, constructions and arrangements of parts, clearly described in the following specification and clearly illustrated in the accompanying drawings, in which:—

Figure 1 is a plan view of the preferred form of the musical notation, Fig. 2 is a plan view showing a modified form of the musical notation, Fig. 3 is a plan view of another modified form of the musical notation.

Referring to the accompanying drawings A denotes a musical staff, which is printed upon a sheet of paper in the usual manner, and which is provided with a series of note symbols B, arranged in suitable musical order thereon. Each note symbol consists of the usual head and stem, which depends from the head in some cases while in others it extends above the head. Below the note symbols B a series of numerals B' are arranged for indicating the frets on the neck of the instrument to be engaged by the fingers or thumb of the player while acting on the string or strings with the bow. Below the first note symbol, the numeral 1 is arranged, which indicates to the player that fret 1 on the instrument is to be engaged. Below the second note symbol the cipher 0 is arranged, which indicates that the thumb is to be used on the strings, in the usual manner. Below the third note symbol the numeral 3 is arranged, which indicates that the third fret is to be acted on. The numeral 2½ indicates the fret division of 2½, which is marked on the instrument. ½ placed below a note symbol indicates the fret division of ½.

Above the note symbols B a series of small parallel lines C are arranged for the purpose of indicating to the player the particular strings to be acted on in articulating the respective notes. These string indicating lines are arranged in parallelism to each other and to the direction of the stems of the note symbols, so that the mental process of translating their meaning will be simple and the player or student will not be confused. Lines are used for indicating the strings of the instrument as they represent a visual appearance very much like that presented by the strings of the instrument, such as a violin, and the lines are arranged on the notation transverse to the staff lines or vertically, so that they will be impressed on the mind of the player or student in substantially the same order that the strings and stems of the note symbols impress themselves. Over the first note symbol Fig. 1 two string indicating lines are arranged, which indicates that the second string, or the A string, is to be acted on by the bow. Where three small lines appear above a note symbol the third string, or the D string is indicated. Where a single line appears above a note symbol the first string, or the E string is indicated. Where four small lines appear above a note symbol, the fourth string on the neck of the instrument, reading from right to left, or the G string, is indicated as the string which is to be acted on.

In order that the pupil or student may readily interpret the indicating lines and marks on the notation without confusion it is desired that the neck of the violin or other instrument used be provided with a series of small lines arranged in correspondence to the small lines on the notation. The usual transverse lines are arranged on the neck of the instrument and across said lines the fret numbers are formed, beginning with ½, which indicates a subdivision of the upper fret, then 1, which indicates the first fret, then 2, then 2½, which indicates a subdivision of fret 2, and then 3. Above the first transverse line, number ½, the series of small lines are arranged. One small line being placed adjacent the first string, from the right, or the E string, two small lines being placed adjacent the next string, or the A string, three small lines being placed adjacent the next string, or the D string, and four small lines being placed adjacent the next string or the G string.

In Fig. 2 a view of a modified form of the improved notation is shown, wherein the staff is indicated by I, on which a series of note symbols are arranged. Each note symbol is provided with the usual head or oval figure and at least one stem, in the case of divisional note symbols, such as half note and quarter note symbols. Instead of arranging the string indicating lines above the note symbols, as shown in Fig. 1, I multiply the stems of the note symbols in some cases, where the note symbol indicates that either A, D, or G strings are to be acted on, while a single stem is used to indicate the first or E string. In other words all E notes of a divisional character are provided with a single stem, which indicates the first or E string; all A notes are provided with two stems, which indicates the second string or A string; all D notes are provided with three stems, which indicates the third or D string; and all G notes are provided with four stems, which indicates the fourth or G string. Below the note symbols the frets indicating numbers are arranged, as in Fig. 1. In the form of notation shown in Fig. 2 the stems are arranged, on the plural stem notes, in a parallel relation to each other, and as shown, extend vertically from the heads or oval figures of the note symbols. In Fig. 3 a modified form of the notation is shown wherein the stems diverge from the heads or oval figures of the note symbols and extend vertically from said heads or figures. This latter arrangement permits of easier reading. The form of notation shown in Fig. 3 is provided with the fret indicating numerals arranged below the note symbols.

Not only do the string indicating lines in the notation shown in Fig. 1 correspond in order to the order of the strings on the instrument, but these string indicating lines also correspond to the vertical arrangement of the stems of the divisional note symbols. The notation shown in Figs. 2 and 3 may be preferred by some persons for this reason to the notation shown in Fig. 1. In the latter form of notation the string indicating lines are arranged above the heads or oval figures of the note symbols and over the staff lines, while in the former forms the string indicating lines are arranged on the staff, in transverse relation therewith, so as to form a part of the note symbols. In both forms the string indicating lines or stems extend vertically from the note symbol heads or figures.

Having described my invention I claim and desire to secure by Letters Patent:—

1. In means for representing music, a musical notation comprising a staff, a series of musical note symbols arranged on the staff, fret indicating numbers arranged below the note symbols, and parallel lines arranged above the heads of the note symbols for indicating the strings of a musical instrument.

2. In means for representing music, a musical notation comprising a staff, a series of note symbols having heads arranged on the staff, a series of fret indicating numerals arranged below the note symbol heads, and a series of string indicating lines arranged in parallel order to each other and transversely to the staff over the heads of the note symbols.

3. In means for representing music, a musical notation comprising a staff, a series of note symbols arranged on the staff having heads, a part of said note symbols having single stems disposed transversely of the staff and the rest of the note symbols having a number of stems disposed transversely of the staff, said stems indicating the strings of a musical instrument, and fret-indicating numerals arranged below the heads of the note symbols.

4. In means for representing music, a musical notation comprising a staff, a series of note symbols, arranged on the staff, a part of the note symbols having single stems indicating the E string of a musical instrument and a part of the other note symbols having two or more stems indicating the A, D, and G strings of a musical instrument, the stems of the plural note symbols diverging from each other and extending transversely across the staff, the single stems also extending transversely across the staff, and a series of fret indicating numerals arranged below the note symbols.

In testimony whereof I affix my signature in the presence of two witnesses.

WILLIAM B. KRAFT.

Witnesses:
WALLACE J. HILL,
HENRY I. QUINN.

Copies of this patent may be obtained for five cents each, by addressing the "Commissioner of Patents, Washington, D. C."